(12) United States Patent
Hoelle et al.

(10) Patent No.: US 7,050,960 B2
(45) Date of Patent: May 23, 2006

(54) METHODS AND APPARATUS FOR GENERATING DRAWINGS FROM COMPUTER GENERATED MODELS

(75) Inventors: James Stephen Hoelle, Hamilton, OH (US); Kevin Dennard Hamilton, West Chester, OH (US); Kenneth Alvin Jungeberg, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 1093 days.

(21) Appl. No.: 09/728,026

(22) Filed: Nov. 30, 2000

(65) Prior Publication Data

US 2002/0065638 A1 May 30, 2002

(51) Int. Cl.
*G06F 9/45* (2006.01)

(52) U.S. Cl. .................. 703/22; 700/97; 700/182; 345/619

(58) Field of Classification Search ............ 707/22; 700/97, 182; 345/419, 420, 964, 619, 965; 715/502

See application file for complete search history.

(56) References Cited

U.S. PATENT DOCUMENTS

| | | | |
|---|---|---|---|
| 3,867,616 A | 2/1975 | Korelitz et al. | |
| 4,656,603 A | 4/1987 | Dunn | |
| 4,823,303 A | 4/1989 | Terasawa | |
| 4,885,704 A | 12/1989 | Takagi et al. | |
| 4,928,233 A | 5/1990 | Millis | |
| 5,146,561 A | 9/1992 | Carey et al. | |
| 5,170,466 A | 12/1992 | Rogan et al. | |
| 5,251,294 A | 10/1993 | Abelow | |
| 5,260,883 A | 11/1993 | Wilson | |
| 5,293,479 A | 3/1994 | Quintero et al. | |
| 5,321,816 A | 6/1994 | Rogan et al. | |
| 5,345,550 A | 9/1994 | Bloomfield | |
| 5,467,293 A * | 11/1995 | Summer et al. | 703/2 |
| 5,504,687 A | 4/1996 | Wolf | |
| 5,517,428 A | 5/1996 | Williams | |
| 5,524,198 A | 6/1996 | Matsumoto et al. | |
| 5,555,406 A | 9/1996 | Nozawa | |
| 5,579,469 A | 11/1996 | Pike | |
| 5,590,255 A | 12/1996 | Takeshima et al. | |
| 5,630,079 A | 5/1997 | McLaughlin | |
| 5,634,016 A * | 5/1997 | Steadham et al. | 345/753 |
| 5,646,992 A | 7/1997 | Subler et al. | |
| 5,678,002 A | 10/1997 | Fawcett et al. | |
| 5,680,525 A | 10/1997 | Sakai et al. | |
| 5,721,827 A | 2/1998 | Logan et al. | |
| 5,764,972 A | 6/1998 | Crouse et al. | |
| 5,826,265 A | 10/1998 | Van Huben et al. | |
| 5,862,322 A | 1/1999 | Anglin et al. | |
| 5,920,867 A | 7/1999 | Van Huben et al. | |
| 5,970,490 A | 10/1999 | Morgenstern | |
| 5,987,497 A | 11/1999 | Allgeier | |
| 5,999,908 A | 12/1999 | Abelow | |

(Continued)

*Primary Examiner*—Albert W. Paladini
(74) *Attorney, Agent, or Firm*—William Scott Andes; Armstrong Teasdale LLP

(57) ABSTRACT

A drafting system that automatically generates digital drawings from a computer generated model of a bracket is described. The drafting system includes a data storage device which stores information relevant to a plurality of users including a plurality of orthographic projection rules. After the computer generated model of the bracket is introduced to the system, a plurality of drawing functions generate weld information, dimensions, and cross references to parts lists that are assigned to the bracket. Additionally, a plurality of editing features enable the user to edit objects automatically inserted within the drawings by the drafting system.

51 Claims, 6 Drawing Sheets

U.S. PATENT DOCUMENTS

| | | | |
|---|---|---|---|
| 6,002,854 A | 12/1999 | Lynch et al. | |
| 6,009,406 A | 12/1999 | Nick | |
| 6,167,406 A | 12/2000 | Hoskins et al. | |
| 6,195,697 B1 | 2/2001 | Bowman-Amuah | |
| 6,219,586 B1 | 4/2001 | Sakai | |
| 6,226,618 B1 | 5/2001 | Downs et al. | |
| 6,240,421 B1 | 5/2001 | Stolarz | |
| 6,243,611 B1 | 6/2001 | Hazama et al. | |
| 6,253,236 B1 | 6/2001 | Troxel et al. | |
| 6,259,446 B1 | 7/2001 | Matheny et al. | |
| 6,268,853 B1 | 7/2001 | Hoskins et al. | |
| 6,268,871 B1 | 7/2001 | Rice et al. | |
| 6,633,400 B1 * | 10/2003 | Sasaki et al. | 358/1.15 |
| 6,633,688 B1 * | 10/2003 | Nixon et al. | 382/305 |
| 6,647,305 B1 * | 11/2003 | Bigelow | 700/97 |

* cited by examiner

METHODS AND APPARATUS FOR GENERATING DRAWINGS FROM COMPUTER GENERATED MODELS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to gas turbine engines and, more particularly, to automated drafting systems used to generate digital drawings of brackets attached to such an engine.

Sheet metal brackets are designed to mount tubing and other accessories to a gas turbine engine. The brackets are bent into a shape from a flat pattern, and may be made from a single piece or the bracket may include welded gussets or braces. The bracket complexity may range from a single bend with no welds up to approximately twenty bends with numerous welded gussets and bend reliefs. Nut plates, spacers, and clips may also be welded or riveted to the brackets.

Currently, brackets are designed using computer aided design (CAD) systems, see for example U.S. Pat. No. 5,689,435. More specifically, in operation, a system user supplies information such as face selection, part location, and other attributes when prompted by the CAD program, and with such inputs, the system generates a model of the bracket.

The computer generated model is given to a detailer who creates drawing views, dimensions, material fastening information, and general notation that defines the bracket. Typically, the general notation includes part cross-references to a parts list, and welding symbology. Because each bracket is unique with respect to drawing views, dimensions, and material fastening, creating the drawing views, dimensions, material fastening information, and the general notation may be a labor-intensive and time-consuming task. Furthermore, because of the uniqueness of the drawings, the drawings are not standardized between brackets, and a quality of the drawings is dependant upon the skills of the detailer.

BRIEF SUMMARY OF THE INVENTION

In an exemplary embodiment, a drafting system automatically generates a digital drawing from a computer generated model of the part. In the exemplary embodiment, the computer generated model is of a bracket. The drafting system includes a data storage device which stores the computer generated model and information relevant to a plurality of users including a plurality of orthographic projection rules. After the computer generated model of the bracket is retrieved, weld information is assigned to the bracket, and any slots or openings within the bracket are defined. A plurality of drawing functions presented to the user enable drawing views to be automatically generated from the computer-generated model in accordance with preferences of the user. Additionally, after the drawing views are generated, a plurality of editing features enable the user to edit objects that were automatically inserted within the drawing views by the drafting system. Furthermore, as the drawings are generated, dimensions, part reference to parts lists, and weld symbology are automatically created and inserted in the drawing views. As a result, the drafting system automatically generates digital drawing views from computer generated models of brackets in a cost effective and reliable manner.

DETAILED DESCRIPTION OF THE INVENTION

Figure 1:
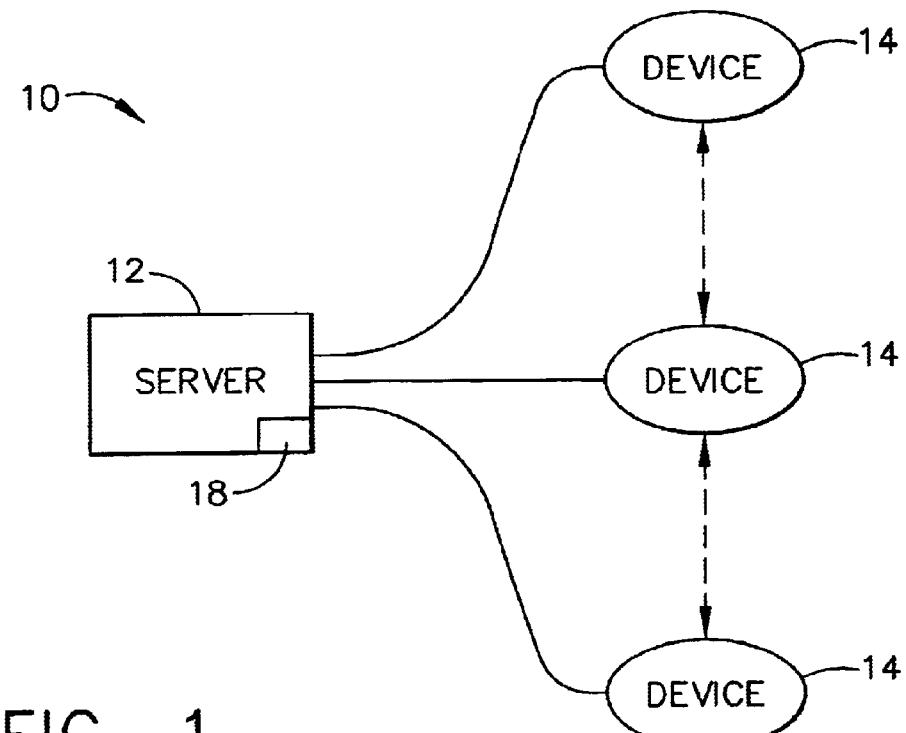
FIG. 1 is block diagram of a drafting system for generating digital drawings from a computer generated model of a part.

FIG. 1 is block diagram of a drafting system 10 for generating digital drawings (not shown) from a computer generated model (not shown) of a part (not shown). In one embodiment, the computer generated model represents a sheet metal bracket (not shown) designed to mount tubing (not shown) and other accessories to a gas turbine engine (not shown). Drafting system 10 is an automated system that includes a server system 12 and a plurality of client systems 14 connected to server system 12. In one embodiment, client system 14 includes a computer (not shown) including a web browser, a central processing unit (CPU), a random access memory (RAM), an output device, for example a monitor, a mass storage device, and an input device, for example a keyboard or a mouse. In an alternative embodiment, client systems 14 are servers for a network of customer devices.

Server system 12 is accessible to client system 14 via the Internet. Client system 14 is interconnected to the Internet through many interfaces including dial-in-connections, cable modems, special high-speed ISDN lines, and networks, such as local area networks (LANs) or wide area networks (WANs). In one embodiment, client system 14 includes any client system capable of interconnecting to the Internet including a web-based phone or other web-based connectable equipment. Server system 12 is also connected to a mass storage device 18. Mass storage device 18 is accessible by potential users through client system 14.

Figure 2:
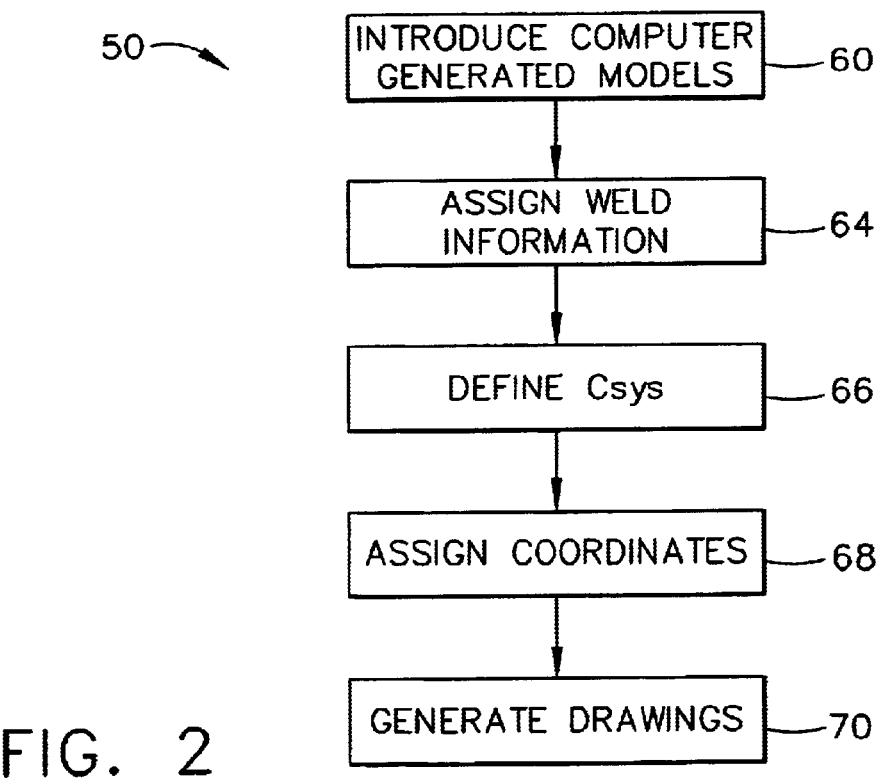
FIG. 2 is a flowchart of an program for generating digital drawings from a computer generated model of a part using the server system shown in FIG. 1.
Figure 3:
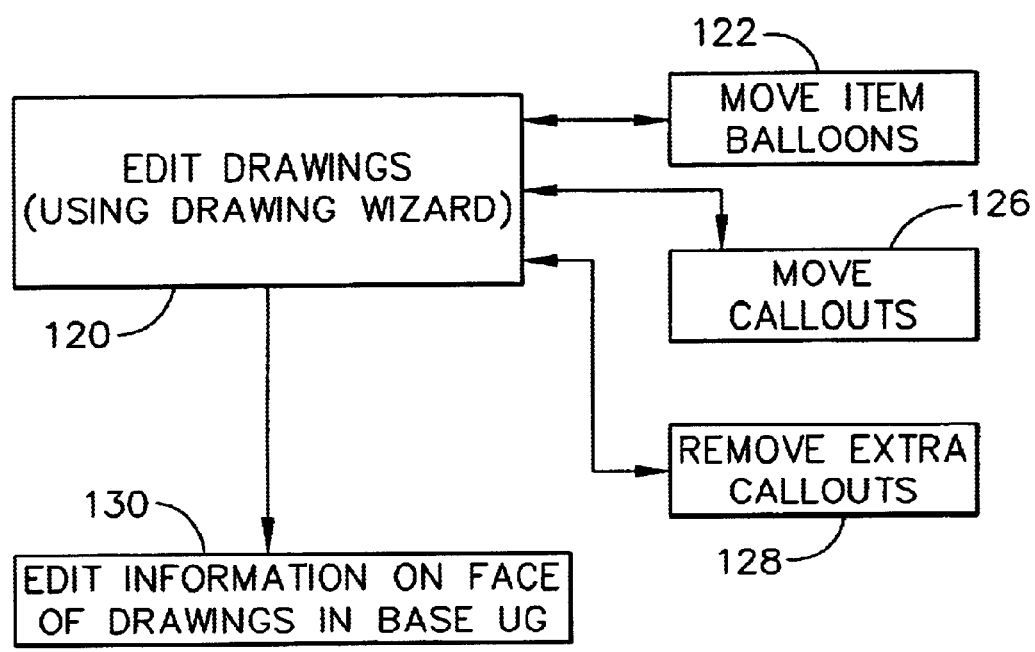
FIG. 3 is a flowchart illustrating a sequence of process steps executed in editing drawings created with the drafting system shown in FIG. 1.

FIG. 2 is a flowchart 50 of a program used with drafting system 10 (shown in FIG. 1) for generating digital drawings from a computer generated model of a part. FIG. 3 is a flowchart 52 illustrating a sequence of process steps executed in editing drawings created with drafting system 10. More specifically, in one embodiment, the program is known as a Bracket Drawing Wizard, and is used to generate a digital drawing from a computer generated model of a gas turbine engine bracket. In one embodiment, the computer generated model is represented with two-dimensional, flat patterns. The program may be executed on a computer (not shown), such as a personal computer or a workstation, including an interface (not shown), such as a keyboard and a display, a processor, and a memory.

The program is stored in mass storage device 18 (shown in FIG. 1) and is accessible to a potential user through client systems 14 (shown in FIG. 1) to generate digital drawing views from a computer generated model of a part. The computer generated models of a part are retrieved 60 from mass storage device 18 by the program. The computer generated models are stored in mass storage device 18 in an electronic format that is compatible with computer aided design (CAD) type programs. In one embodiment, the computer generated models are produced with an interactive configuration design system (ICDS) for bracket design as described in U.S. Pat. No. 5,689,435, and the computer generated models include a bracket intelligence builder module for generating intelligence data for the bracket model, a bracket unfolding module for unfolding a bracket model to a flat pattern, and a bracket folding module for folding a bracket flat pattern.

A plurality of orthographic projection rules that govern the generation of the digital drawing in accordance with the program are stored in mass storage device 18. More specifically, the orthographic rules pre-determine which drawing views will be generated from the computer generated model.

After the computer generated model of a part is retrieved 60 from mass storage device 18, weld information is assigned 64 to the weld faces. In one embodiment, weld information is assigned 64 using a weld builder function in ICDS. More specifically, as described in more detail below, each type of weld to be added is specified. For example, the weld may be a corner weld, a butt weld, or a fillet weld.

A Csys is then defined 66 by a user. The Csys represents a coordinate reference system from which any openings or slots represented within the computer generated model of the bracket may be referenced. More specifically, after the Csys is defined 66, coordinates are assigned 68 to the openings or slots within the bracket to be drawn.

The drawing views are then generated 70 within drafting system 10. More specifically, each drawing view generated 70 is defined using the orthographic projection rules applicable to a specific drawing view to be generated 70 which are populated within specific drafting system functions used in generating 70 specific drawing views. The user may select and execute any of the drafting functions available as menu selection at this stage. More specifically, system 10 permits the user to cycle through each drafting function sequentially, or view each function independently, one function at a time. Additionally, the user may select an "Exit" option to terminate the program.

The functions are divided into seven modules, namely:

View Placement,

Holes,

Slots,

Welds,

Item ID Balloons,

Part Marking Label, and

Dimensions.

Each of these modules, described in more detail below, includes an Exit to return the user to the previous menu.

Each item created within drafting system 10 has an attribute attached to the item that associates the item with the specific function module of drafting system 10 that created the object. Whenever drafting system 10 begins a function module, all items with attribute values, created in earlier drawing generations 70, attached to that specific function module are deleted.

The following discussion describes each function module in more detail. The view module includes a main drawing view and five orthographic projections. The main drawing view is determined after the Csys is defined 66. More specifically, as a result of the pre-stored orthographic rules, a main view, a pair of views in each horizontal direction, a pair of views in each vertical direction, and a rear view are generated 70 within drafting system 10.

Desired drawing views are selected using an input device, and any non-selected drawing views are deleted within system 10. The selected views, flat pattern views, trammel points, bend tables, and decals are then added to the drawing views generated 70. As the desired drawing views are added to the drawing views selected to be generated 70, the non-selected drawing views are compared to the computer generated model with the program to ensure a drawing view necessary to illustrate a spacer is not inadvertently deleted. If an oblique drawing view is required for a spacer to be seen, the program is paused, additional modules are not displayed, and the user is notified that an additional drawing view is required for a spacer to be seen. The user is then given the option of adding the additional drawing view to the drawing views generated 70 or displaying other drafting system function modules.

The holes module is selected to determine which circular openings are fastener openings. More specifically, as described in more detail below, during the execution of the holes module, the program compares each circular opening assigned 68 coordinates against predetermined data to determine which openings are fastener openings and which are lightening holes. The predetermined data is selected based on the type of brackets to be digitally drawn. In one embodiment, each opening having a diameter less than approximately 0.40 inches is defined as being a fastener opening. The fastener openings are then automatically labeled on drawing views generated 70 and on the flat pattern views. Additionally, tables are automatically created for each opening.

The slots module is then selected and a diameter of slots assigned 68 coordinates are compared to pre-determined values to determine which slots are lightening openings. The pre-determined value is selected based on the type of bracket to be digitally drawn. In one embodiment, each slot having a diameter greater than 0.40 inches is defined as a lightening opening. Identified slots are then automatically labeled on drawing views generated 70 and on the flat pattern views.

The weld module defines all weld surface pairs in the computer generated model of the bracket, as described in more detail below. More specifically, all welds that are not associated with a spacer, are defined and automatically labeled in the drawing views to be generated 70. More specifically, welds for the spacers are inserted in the drawing views in ID balloons, and clocking lines for all welds and associated labels are inserted in a drawing view that is normal to the spacers.

The ID balloons module compares each solid pre-stored in mass storage device 18 to drawings generated 70 to define parts list items. Item balloons are then automatically labeled in the main view, the Csys view, for each item defined, except for brackets which are labeled in flat pattern views. However, if an item to be labeled is not visible in the main view, the item balloon is inserted in a drawing view where the item is visible. Spacers are labeled to include material, size, and weld information. In one embodiment, when items are defined that have a quantity greater than one, only one occurrence of each item is automatically labeled within the drawing views generated 70.

The parts marking module automatically labels items within the main drawing view. However, if a label is not visible in the main view, the program inserts "Far Side" to indicate that the label is inserted on a far side of the bracket.

The dimensions module automatically labels dimensions on the drawing views. In one embodiment, spacer thickness dimensions are labeled in a drawing view looking normal to an axis of revolution for the spacer, and reference lines are labeled in a drawing view looking normal to a plane of the spacer.

Drawings may also be edited 120 using drafting system 10. More specifically, a plurality of editing features are available within drafting system 10 to edit callouts placed automatically as drawing views were generated 70. Initially, item balloons are moved 122. More specifically, the item balloons are cycled and displayed to the user, such that an item ID balloon labeled for a multiple quantity item may be moved and relabeled. More specifically, as the item balloons are cycled, the user may move 122 an ID balloon from a specific item to another item within the multiple quantity item family. For example, initially an ID balloon for one of eight identical rivets may have been labeled on a first of the eight rivets, and if the user would prefer to have the ID balloon labeled on a different rivet, as the item balloons are cycled, the ID balloon may be moved 122.

Callouts are then moved 126 in a manner similar to that used in moving 122 the ID balloons. Specifically, the callouts are cycled and displayed to the user, such that the user may select a callout and move the ID balloon callout from one drawing view to another. Appropriate callouts include, but are not limited to, item ID balloons, part marking labels, spacer clocking lines, and spacer dimensions. The user selects a callout and the program cycles through the drawing views to present appropriate drawing views of where the callout may be move 126. More specifically, drafting system 10 only presents drawing views to the user that illustrate the item in a proper orientation for dimensions and clocking lines to be labeled.

Extra callouts are then removed 128 such that only one member of a group of identical callouts is labeled within the drawing views. More specifically, when a member of a group of identical callouts is selected, drafting system 10 temporarily highlights, e.g., changes the color of, the callouts that have the same text, including hole callouts, slot callouts, and spacer weld callouts. The user may select which callouts to remove 128, and drafting system 10 compares the selected callout to the non-selected callouts to verify that at least one callout of each type remains labeled within the drawing views. If at least one callout of each type remains labeled, the non-selected callouts are removed 128.

Information on a face of each drawing is then edited 130 using Unigraphics (UG) functionality. More specifically, information on a face of each drawing may be rearranged using base UG functionality. For example, drawing views may be moved, label text may be moved, dimensions may be combined, and tables may be moved. Furthermore, notes may be added to the drawing views.

Figure 4:
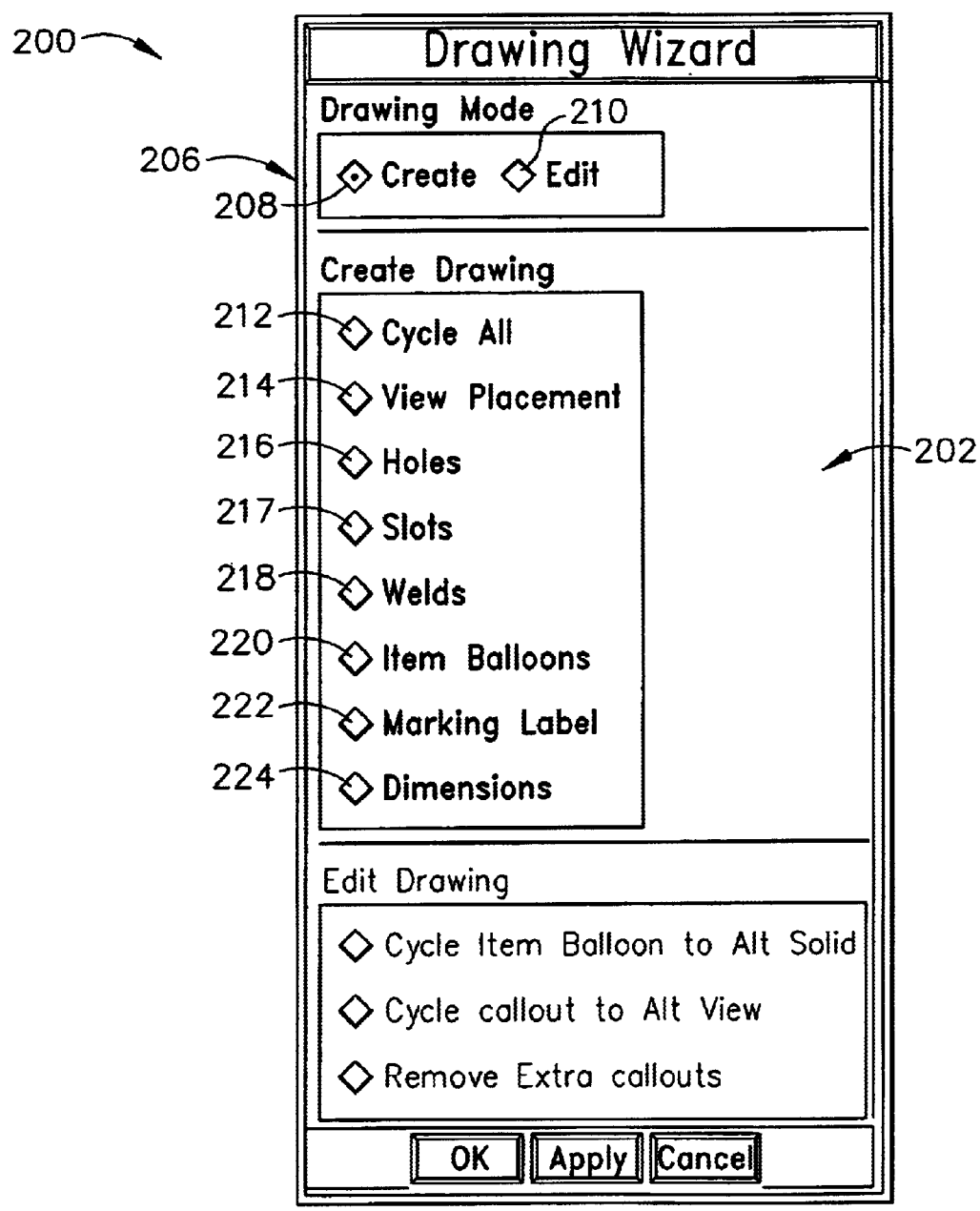
FIG. 4 is an exemplary drawing wizard dialog page used with the program shown in FIG. 2 and including a create mode highlighted for selection.
Figure 5:
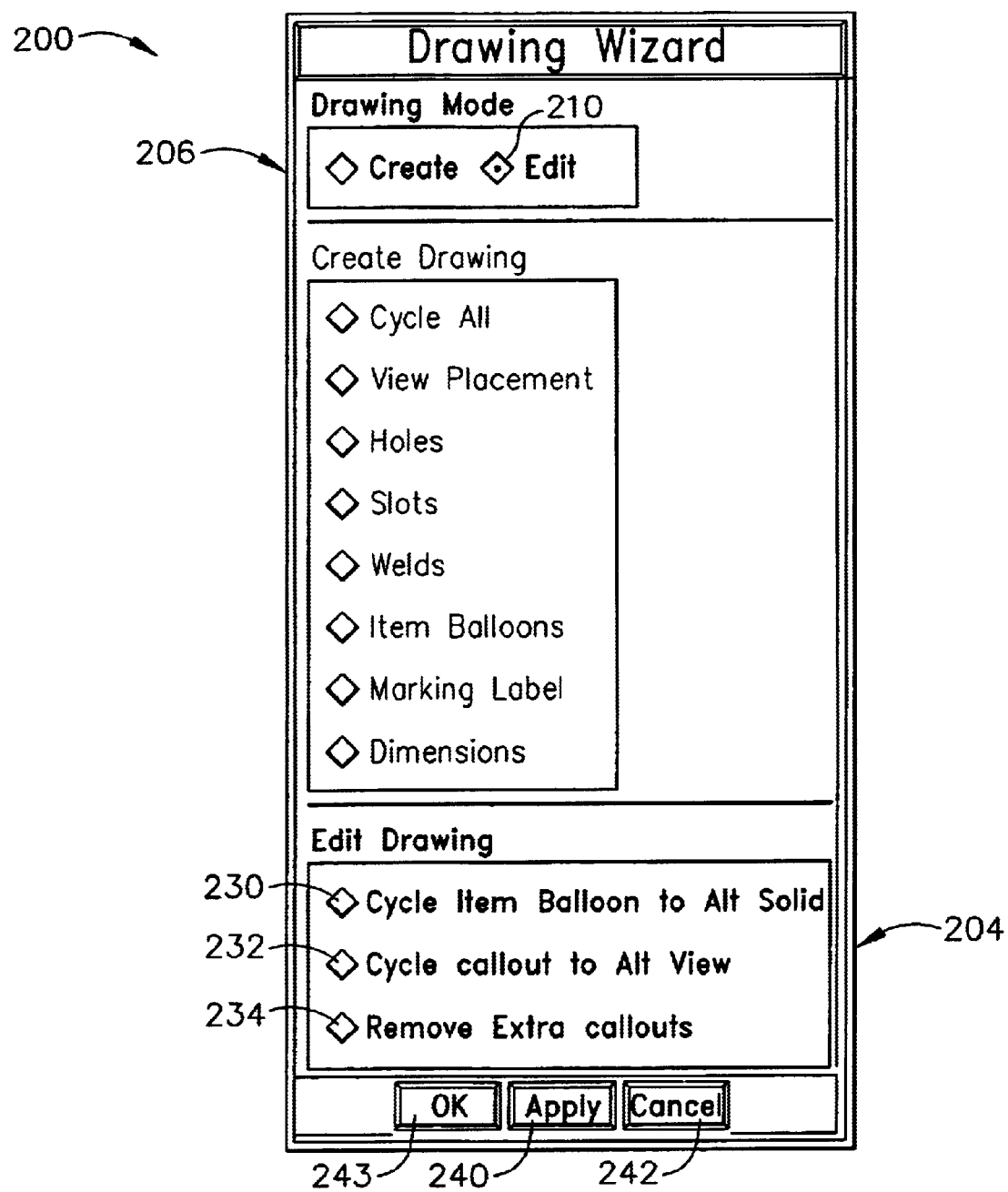
FIG. 5 is the exemplary drawing wizard dialog page shown in FIG. 4 and including an edit mode highlighted for selection.

FIGS. 4 through 8 detail navigation through an exemplary web-site linked to system 10 (shown in FIG. 1) via device 14 (shown in FIG. 1) and server 12 (shown in FIG. 1). More specifically, FIG. 4 is an exemplary drawing wizard dialog page 200 including a drawing mode menu selection area 202 highlighted for selection, and FIG. 5 illustrates drawing wizard dialog page 200 including an edit drawing mode menu selection area 204 highlighted for selection. Drawing wizard dialog page 200 is displayed when a user selects the program known as Bracket Drawing Wizard from a main menu (not shown). Drawing wizard dialog page 200 includes a drawing mode selection area 206 including a create button 208 and an edit button 210.

Create button 208 enables a user to generate 70 (shown in FIG. 2) a digital drawing from a computer generated model stored within mass storage device 18 (shown in FIG. 1). More specifically, selecting create button 208 highlights drawing mode menu selection area 202 to enable the user to select and execute any of the drawing function modules available as menu selection within drawing mode menu selection area 202. More specifically, drawing mode menu selection area 202 includes a cycle all button 212, a view placement button 214, a holes button 216, a slots button 217, a welds button 218, an items balloons button 220, a marking label button 222, and a dimensions button 224.

Generally, each respective function module button 212, 214, 216, 217, 218, 220, 222, and 224 permits the user to execute each respective program function module as described above. More specifically, cycle all button 212 permits the drawing function modules to be displayed to the user sequentially. Additionally, view placement button 214 executes the view module, holes button 216 executes the holes module, slots button 217 executes the slots module, welds button 218 executes the weld module, items balloons button 220 executes the ID balloons module, marking label button 222 executes the part marking module, and dimensions button 224 executes the dimensions module.

Edit button 210 enables a user to edit 120 (shown in FIG. 2) drawing views generated from the computer generated model of the part. More specifically, selecting edit button 210 highlights edit drawing mode menu selection area 204 to enable the user to select and execute any of the editing features available within the program to edit callouts placed automatically as drawing views were generated 70. More specifically, edit drawing mode menu selection area 204 includes a cycle item balloon to alternate solid button 230, a cycle callout to alternate view button 232, and a remove extra callouts button 234.

Generally, each respective button 230, 232, 234 permits the user to execute each respective edit program feature as described above. More specifically, cycle item balloon to alternate solid button 230 permits item ID balloons to be moved 122 (shown in FIG. 3), cycle callout to alternate view button 232 permits callouts to be moved 126 (shown in FIG. 3), and remove extra callouts button 234 permits extra callouts to be removed 128 (shown in FIG. 3). Furthermore, an apply button 240 is selected to retain editing changes completed using the edit program features, and a cancel button 242 is selected to cancel editing changes completed using the edit program features and return the drawing views to a state of each drawing view prior to the edit program features being executed. In addition, an OK button 243 ends the user interface with page 200.

Figure 6:
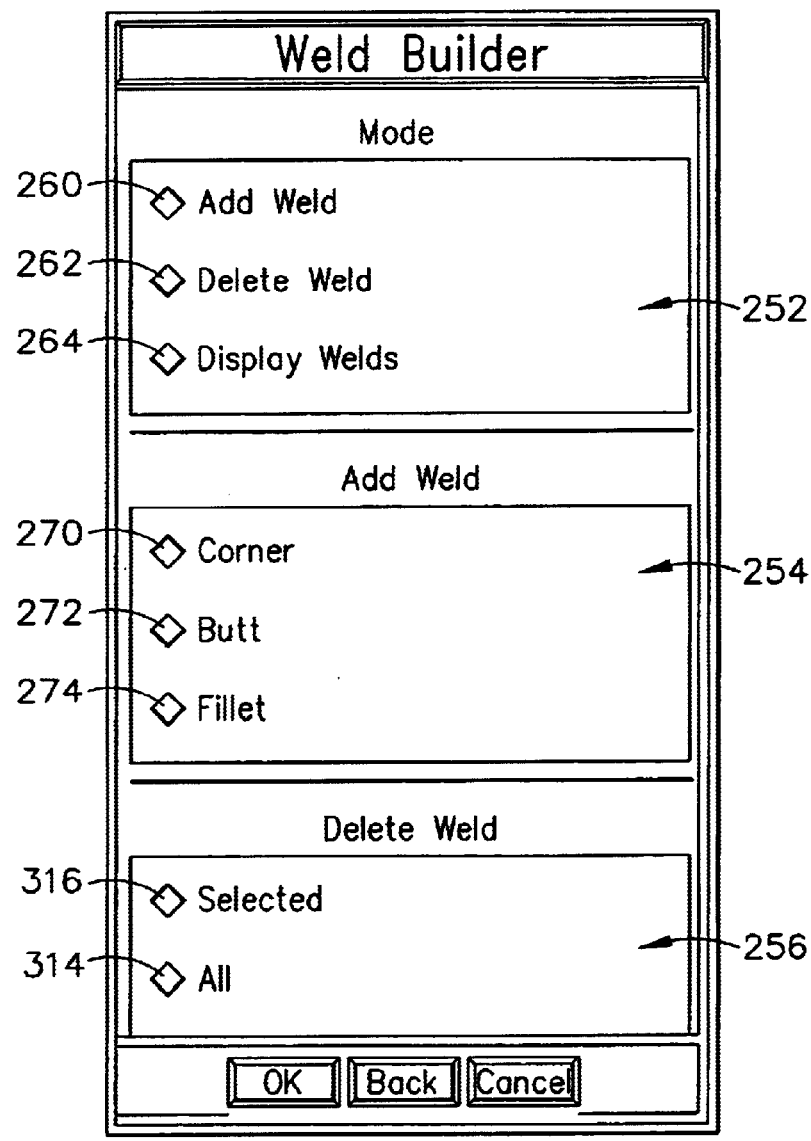
FIG. 6 is an exemplary weld builder main dialog page used with the program shown in FIG. 2.

FIG. 6 is an exemplary weld builder dialog page 250 including a weld mode menu selection area 252, an add weld menu selection area 254, and a delete weld menu selection area 256. Weld builder dialog page 250 is displayed when a user executing the program selects a weld builder icon from the main menu to assign 64 weld information to the weld faces. More specifically, weld mode menu selection area 252 includes an add weld button 260, a delete weld button 262, and a display welds button 264.

Selecting add weld button 260 highlights add weld menu selection area 254 which includes a corner weld button 270, a butt weld button 272, and a fillet weld button 274. If corner weld button 270 or butt weld button 272 is selected, the user is prompted to pick face pairs. The program compares the face pairs selected to ensure each face has one dimension that is equal to a thickness of the bracket. If one such dimension is not located, the program prompts the user to either proceed or to quit. Additionally, the program determines a minimum distance between the face pairs and prompt the user if the distance is greater than a predetermined value. In one embodiment, the predetermined value is approximately equal 0.035 inches. Again, the user will be given the option of continuing or quitting.

The program then attaches the weld type attribute to the paired faces, and determines an appropriate weld number based on existing welds already determined.

Figure 7:
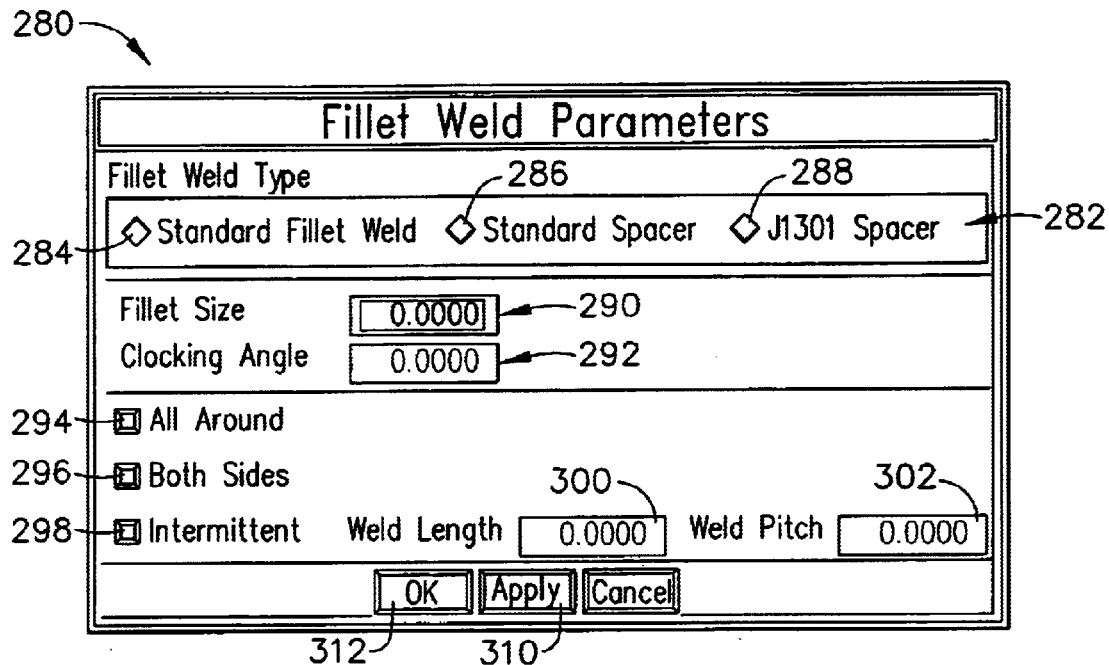
FIG. 7 is an exemplary fillet weld dialog page used with the program shown in FIG. 2.

FIG. 7 is an exemplary fillet weld dialog page 280 used with the program. If fillet weld button 274 is selected, the user is prompted to pick face pairs and fillet weld dialog page 280 is displayed. Page 280 includes a fillet weld type selection area 282 including a standard fillet weld button 284, a standard spacer button 286, and a J1301 spacer button 288. Additionally, page 280 includes a fillet size input box 290 and a clocking angle input box 292. Furthermore, weld dialog page 280 includes an all around button 294, a both sides button 296, an intermittent button 298, a weld length input box 300, and a weld pitch input box 302.

The user makes dialog selections within fillet weld dialog page 280 as required, and various areas of weld dialog page 280 are activated depending on the selections of the user. More specifically, if intermittent button 298 is selected, weld pitch input box 302 and weld length input box 300 are activated and receive values. The program then compares the inputs received within boxes 300 and 302 to ensure that weld pitch is greater than weld length. If standard spacer button 286 is selected, only fillet size input box 290 is activated to receive input.

If J1301 spacer button 288 is selected, only clocking angle input box 292 is activated to receive input. The program displays a temporary line at clocking angle 0.00 (measured from an origin of a spacer inner diameter edge), but the user may input a new clocking angle value using input box 292 and select apply button 310, and the program will then redisplay the line in its new location. When all selections within weld dialog page 280 are complete, the user selects an ok button 312 to continue the program, and the program, as described above, attaches all weld attributes to the faces.

If delete weld button 262 is selected, delete weld menu selection area 256 is highlighted and activated and the user may select an all button 314 to remove all weld attributes from the drawing views. Furthermore, if the user selects a selected button 316, attributes related to a specific weld may be removed from the drawing views. In addition, selecting display welds button 264, permits the user to view each weld and associated face sequentially. More specifically, weld information relating to each weld is then displayed to the user.

Figure 8:
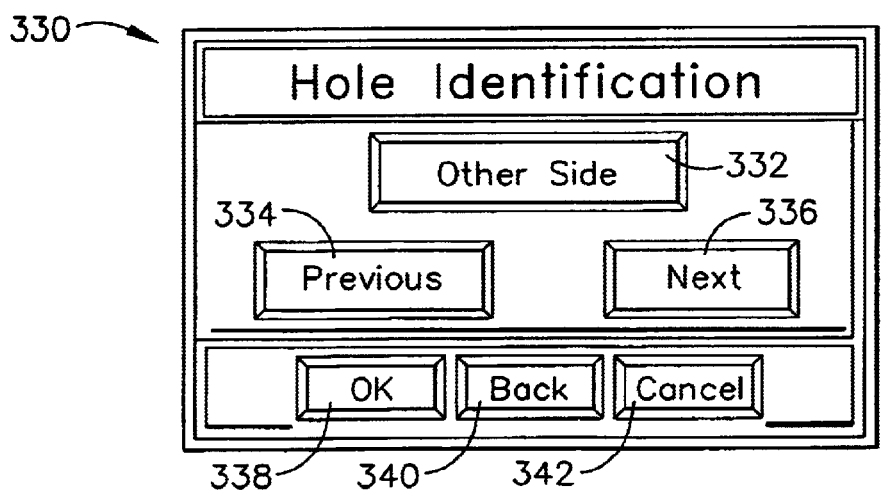
FIG. 8 is an exemplary hole identification dialog page used with the program shown in FIG. 2.

FIG. 8 is an exemplary hole identification dialog page 330 used in defining the execution of the holes module. Specifically, dialog page 330 includes an other side button 332, a previous button 334, a next button 336, an ok button 338, a back button 340, and a cancel button 342.

As described above, the program identifies which openings are fastener holes. More specifically, the program identifies which of the fastener holes are rivet holes by determining which of the fastener holes have rivets extending therethrough. Countersunk rivet heads are then identified to determine which side of the bracket material contains the countersunk head.

The program then identifies spacer which may be attached at any of the holes which are not rivet holes. Specifically, a circular edge of a spacer that is farthest from the bracket is identified and a center point of the spacer is then located. This point is recorded and inserted in the drawing views in tabular format. The program then locates any nutplates that may be attached at any of the non-rivet fastener holes. A circular edge of the bracket hole farthest from the nutplate is located and a point in the center of that circle is inserted in the drawing views in tabular format. Remaining fastener holes are presented to the user through exemplary hole identification dialog page 330.

Specifically, selecting previous button 334 and next button 336 permits the user to cycle through the holes to determine which side of each hole is located by the tabular format. More specifically, the program initially highlights one edge of a first hole in all drawing views. If the user wants to use that specific edge, next button 336 is selected. If the user does not want to use that specific edge, other side button 332 is selected. This process is then repeated for each remaining hole.

The above-described drafting system is cost-effective and accurate. The drafting system automatically generates digital drawings from computer generated models of a part. Specifically, because orthographic projection rules are pre-loaded into the system, the drawing system generates drawings in a standardized format that are facilitated to be more consistent between various drawing views. Furthermore, the drafting system automatically applies dimensions, part reference to parts lists, and weld symbology in tabular format to the drawings. As a result, the digital drawings are generated from the computer generated models of the part in a cost effective and reliable manner.

While the invention has been described in terms of various specific embodiments, those skilled in the art will recognize that the invention can be practiced with modification within the spirit and scope of the claims.

What is claimed is:

1. A method for generating at least one digital drawing using a server system including a client system having a browser and a data storage device, the server system coupled to the client system and the data storage device, a plurality of orthographic rules and a computer generated model of a part stored in the data storage device and accessible by the server system, said method comprising the steps of:

generating a plurality of digital drawing views with the server system, such that the digital drawing views are based on the pre-stored orthographic projection rules;

utilizing an input device to select desired said drawing views;

utilizing a view module to compare non-selected said drawing views to the computer generated model to ensure that a necessary drawing view is not inadvertently deleted; and editing the plurality of digital drawing views with the server system.

2. A method in accordance with claim 1 wherein said step of generating a plurality of digital drawing views further comprises the steps of:

labeling dimensions on the plurality of drawing views produced; and generating part cross references to a parts list based on the computer generated model.

3. A method in accordance with claim 2 wherein said step of generating part cross references further comprises the step of applying the part cross references to the plurality of drawing views.

4. A method in accordance with claim 1 wherein said step of editing the plurality of digital drawing views further comprises the steps of:
moving item balloons automatically created during generation of the digital drawing;
moving callouts automatically created during generation of the digital drawing; and
deleting extra callouts automatically created during generation of the digital drawing.

5. A method in accordance with claim 1 wherein the computer model is two-dimensional, said step of generating a plurality of digital drawing views further comprises the step of generating a plurality of orthographic views representing the computer model.

6. A method in accordance with claim 1 wherein said step of generating a plurality of digital drawing views further comprises the step of applying welding symbology to each of the plurality of drawing views produced.

7. A method in accordance with claim 1 wherein using a view module to compare non-selected said drawing views to the computer generated model to ensure that a necessary drawing view is not inadvertently deleted comprises the view module ensuring that a drawing view necessary to illustrate a spacer is not inadvertently deleted.

8. A method in accordance with claim 1 further comprising determining that an oblique drawing view is required for a spacer to be seen, notifying a user that an additional drawing view is required for a spacer to be seen, and providing an option of adding an additional drawing view to the generated drawing views or displaying other drafting system function modules.

9. A method in accordance with claim 1 further comprising utilizing a holes module to compare circular openings assigned coordinates against predetermined data to determine which openings are fastener openings and which are lightening holes.

10. A method in accordance with claim 1 further comprising utilizing a slots module to compare diameters of slots to pre-determined values to determine which slots are lightening openings.

11. A method in accordance with claim 10 wherein said predetermined values are selected in accordance with a type of bracket to be drawn.

12. A method in accordance with claim 1 further comprising utilizing a weld module of the computer program to define the weld surface pairs in the computer-generated model of the part, and wherein the part is a bracket.

13. A method in accordance with claim 12 further comprising utilizing the weld module to insert welds for spacers in the drawing views in ID balloons, and inserting clocking lines for welds and associated labels in a drawing view normal to the spacers.

14. A method in accordance with claim 13 further comprising utilizing an ID balloons module to compare each sold pre-sorted in the data storage device to the generated drawings to define parts list items, and automatically labeling item balloons in generated views for each item defined except brackets, and labeling brackets in flat pattern views.

15. A method in accordance with claim 1 further comprising utilizing a parts marking module to automatically label items within a main drawing view, except that labels not visible in the main drawing view are marked to indicate that a label is inserted on a far side of a bracket.

16. A method in accordance with claim 1 further comprising utilizing a dimensions module to automatically label dimensions on the drawing views.

17. A method in accordance with claim 16 wherein said automatic labeling of dimensions comprises labeling spacer thickness dimensions for a spacer in a drawing view looking normal to an axis of revolution for the spacer, and labeling reference lines in a drawing view looking normal to a plane of the spacer.

18. An apparatus for generating a digital drawing representation from a computer generated model of a bracket for a gas turbine engine, said apparatus comprising a processor programmed to generate a plurality of digital drawing views from the computer-generated model, said apparatus configured to input a selection of desired said drawing views selected by a user, and said processor programmed to compare non-selected said drawing views to the computer-generated model to ensure that a drawing view necessary to illustrate a spacer is not inadvertently omitted.

19. Apparatus in accordance with claim 18 wherein said processor further programmed to apply orthographic projection rules to generate the plurality of digital drawing views based on the computer generated model.

20. Apparatus in accordance with claim 18 wherein said processor further programmed to label dimensions on the plurality of drawing views produced based on the computer generated model.

21. Apparatus in accordance with claim 18 wherein said processor further programmed to generate part cross references to a parts list based on the computer generated model.

22. Apparatus in accordance with claim 21 wherein said processor further programmed to apply the part cross references to the plurality of drawing views.

23. Apparatus in accordance with claim 18 wherein said processor further programmed to generate the plurality of digital drawing views from a two-dimensional computer generated model of a bracket.

24. Apparatus in accordance with claim 18 wherein said processor further programmed to determine that an oblique drawing view is required for a spacer to be seen, notify a user that an additional drawing view is required for a spacer to be seen, and provide an option of adding an additional drawing view to the generated drawing views or displaying other drafting system function modules.

25. Apparatus in accordance with claim 18 wherein said processor further programmed to compare circular openings assigned coordinates against predetermined data to determine which openings are fastener openings and which are lightening holes.

26. Apparatus in accordance with claim 18 wherein said processor further programmed to compare diameters of slots to pre-determined values to determine which slots are lightening openings.

27. Apparatus in accordance with claim 26 wherein said predetermined values are selected in accordance with a type of bracket to be drawn.

28. Apparatus in accordance with claim 18 wherein said processor further programmed to define the weld surface pairs in the computer-generated model of the part, and wherein the part is a bracket.

29. Apparatus in accordance with claim 28 wherein said processor further programmed to insert welds for spacers in the drawing views in ID balloons, and to insert clocking lines for welds and associated labels in a drawing view normal to the spacers.

30. Apparatus in accordance with claim 29 wherein said processor further programmed to compare each sold presorted in the data storage device to the generated drawings to define parts list items, to automatically label item balloons in generated views for each item defined except brackets, and to label brackets in flat pattern views.

31. Apparatus in accordance with claim 18 wherein said processor further programmed to automatically label items within a main drawing view except labels not visible in the main drawing view, and to mark said labels not visible in the main drawing view to indicate that a label is inserted on a far side of a bracket.

32. Apparatus in accordance with claim 18 wherein said processor further programmed to automatically label dimensions on the drawing views.

33. Apparatus in accordance with claim 32 wherein to automatically labeling dimensions, said processor further programmed to label spacer thickness dimensions for a spacer in a drawing view looking normal to an axis of revolution for the spacer, and to label reference lines in a drawing view looking normal to a plane of the spacer.

34. A system for generating a digital drawing of a computer generated model of a part, wherein said part is a computer-generated model of a bracket for a gas turbine engine, said system comprising:
a client system comprising a browser;
a data storage device for storing information relevant to a plurality of users; and
a server system configured to be coupled to said client system and said data storage device, said server system further configured to generate a plurality of digital drawing views based on the computer-generated model, said server system configured to input a selection of desired said drawing views selected by a user, and said processor programmed to compare non-selected said drawing views to the computer-generated model to ensure that a drawing view necessary to illustrate a spacer is not inadvertently omitted.

35. A system in accordance with claim 34 wherein said server system configured to apply orthographic rules to generate the plurality of digital drawing views.

36. A system in accordance with claim 35 wherein said server system further configured to generate label dimensions on the plurality of drawing views produced.

37. A system in accordance with claim 35 wherein said server system further configured to generate part cross references to a parts list based on the computer generated model.

38. A system in accordance with claim 37 wherein said server system further configured to apply the part cross references to the plurality of drawing views.

39. A system in accordance with claim 35 wherein said server system further configured to generate the plurality of digital drawing views from a two-dimensional computer generated model of a bracket.

40. A system in accordance with claim 35 wherein said server system further configured to include welding symbology on each of the plurality of drawing views produced.

41. A system in accordance with claim 35 wherein the computer generated model represents a gas turbine engine sheet metal bracket, said server system further configured to generate orthographic drawing views representing the computer generated model.

42. A system in accordance with claim 34 wherein said processor further programmed to determine that an oblique drawing view is required for a spacer to be seen, notify a user that an additional drawing view is required for a spacer to be seen, and provide an option of adding an additional drawing view to the generated drawing views or displaying other drafting system function modules.

43. A system in accordance with claim 34 wherein said processor further programmed to compare circular openings assigned coordinates against predetermined data to determine which openings are fastener openings and which are lightening holes.

44. A system in accordance with claim 34 wherein said processor further programmed to compare diameters of slots to pre-determined values to determine which slots are lightening openings.

45. A system in accordance with claim 44 wherein said predetermined values are selected in accordance with a type of bracket to be drawn.

46. A system in accordance with claim 34 wherein said processor further programmed to define the weld surface pairs in the computer-generated model of the part, and wherein the part is a bracket.

47. A system in accordance with claim 46 wherein said processor further programmed to insert welds for spacers in the drawing views in ID balloons, and to insert clocking lines for welds and associated labels in a drawing view normal to the spacers.

48. A system in accordance with claim 47 wherein said processor further programmed to compare each sold presorted in the data storage device to the generated drawings to define parts list items, to automatically label item balloons in generated views for each item defined except brackets, and to label brackets in flat pattern views.

49. A system in accordance with claim 34 wherein said processor further programmed to automatically label items within a main drawing view except labels not visible in the main drawing view, and to mark said labels not visible in the main drawing view to indicate that a label is inserted on a far side of a bracket.

50. A system in accordance with claim 34 wherein said processor further programmed to automatically label dimensions on the drawing views.

51. A system in accordance with claim 50 wherein to automatically labeling dimensions, said processor further programmed to label spacer thickness dimensions for a spacer in a drawing view looking normal to an axis of revolution for the spacer, and to label reference lines in a drawing view looking normal to a plane of the spacer.

* * * * *

UNITED STATES PATENT AND TRADEMARK OFFICE
CERTIFICATE OF CORRECTION

| | | |
|---|---|---|
| PATENT NO. | : 7,050,960 B2 | Page 1 of 1 |
| APPLICATION NO. | : 09/728026 | |
| DATED | : May 23, 2006 | |
| INVENTOR(S) | : Hoelle et al. | |

It is certified that error appears in the above-identified patent and that said Letters Patent is hereby corrected as shown below:

In Claim 28, column 10, line 58, delete "sufface" and insert therefor -- surface --.

Signed and Sealed this

Twenty-seventh Day of November, 2007

JON W. DUDAS
*Director of the United States Patent and Trademark Office*